United States Patent
Lewis et al.

(10) Patent No.: US 10,598,212 B2
(45) Date of Patent: Mar. 24, 2020

(54) AXIAL RETENTION AND ANTI-ROTATION FEATURES FOR HYDRODYNAMIC THRUST BEARINGS

(71) Applicant: Schaeffler Technologies AG & Co. KG, Herzogenaurach (DE)

(72) Inventors: David Lewis, Lexington, OH (US); Aditya Dattawadkar, Wooster, OH (US); David Burky, Massillon, OH (US)

(73) Assignee: SHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/562,071

(22) PCT Filed: Mar. 31, 2015

(86) PCT No.: PCT/US2015/023531
§ 371 (c)(1),
(2) Date: Sep. 27, 2017

(87) PCT Pub. No.: WO2016/159973
PCT Pub. Date: Oct. 6, 2016

(65) Prior Publication Data
US 2018/0073554 A1    Mar. 15, 2018

(51) Int. Cl.
*F16C 17/04* (2006.01)
*F16C 33/10* (2006.01)
(Continued)

(52) U.S. Cl.
CPC .......... *F16C 17/047* (2013.01); *F16C 17/045* (2013.01); *F16C 33/101* (2013.01);
(Continued)

(58) Field of Classification Search
CPC .... F16C 17/047; F16C 17/045; F16C 33/102; F16C 32/0662; F16C 2226/50;
(Continued)

(56) References Cited

U.S. PATENT DOCUMENTS

| 5,007,746 A | 4/1991 | Matzelle et al. |
| 5,401,213 A | 3/1995 | Muchmore et al. |
(Continued)

FOREIGN PATENT DOCUMENTS

| EP | 2947349 A1 * | 11/2015 | ............. F01D 9/041 |
| JP | 2005133731 A * | 5/2005 | ............. F16H 41/28 |
(Continued)

OTHER PUBLICATIONS

International Search Report for PCT/DE2015/023531; 11 pgs; dated Dec. 22, 2015 by Korean Intellectual Property Office.

*Primary Examiner* — Marcus Charles
(74) *Attorney, Agent, or Firm* — LeKeisha M. Suggs

(57) ABSTRACT

A hydrodynamic thrust bearing for a torque converter comprising: an axis of rotation; a first radial thrust surface; a second radial surface, opposite the first radial thrust surface, including at least two axially protruding anti-rotation pins for preventing relative motion with one of either a stator assembly or an impeller once assembled; an inner circumferential surface defining an opening concentric with the axis of rotation; an outer circumferential surface; and, an axial retention means for attaching to the one of either a stator assembly or an impeller and including at least two resilient tabs, each tab comprising: a deflectable portion; a lockable portion; and, an axial portion having a first width and connecting the deflectable portion and the lockable portion. A torque converter having a hydrodynamic thrust bearing as described is also provided.

13 Claims, 10 Drawing Sheets

(51) Int. Cl.
*F16C 32/06* (2006.01)
*F16H 41/24* (2006.01)
*F16H 45/02* (2006.01)

(52) U.S. Cl.
CPC ...... *F16C 32/0662* (2013.01); *F16C 2226/50* (2013.01); *F16C 2226/74* (2013.01); *F16H 41/24* (2013.01); *F16H 45/02* (2013.01); *F16H 2041/246* (2013.01); *F16H 2045/0205* (2013.01); *F16H 2045/0231* (2013.01); *F16H 2045/0278* (2013.01)

(58) Field of Classification Search
CPC .... F16C 2226/74; F16C 33/101; F16H 41/24; F16H 45/02; F16H 2045/246; F16H 2045/0205; F16H 2045/0231; F16H 2041/246
USPC ......... 384/91, 121, 127, 368, 420, 620, 622; 60/330; 192/107, 109, 110 B, 113.36
See application file for complete search history.

(56) References Cited

U.S. PATENT DOCUMENTS

| | | | | |
|---|---|---|---|---|
| 5,846,001 | A * | 12/1998 | Muntnich | F16C 19/30 384/620 |
| 5,964,329 | A * | 10/1999 | Kawaguchi | F16H 45/02 192/113.36 |
| 6,502,994 | B2 * | 1/2003 | Jackson | F16C 17/04 384/368 |
| 7,887,240 | B2 * | 2/2011 | Marathe | F16C 17/04 384/303 |
| 2001/0033704 | A1 | 10/2001 | Jackson | |
| 2003/0121744 | A1 | 7/2003 | Yamamoto et al. | |
| 2004/0076522 | A1 * | 4/2004 | Ochi | F16D 33/00 416/204 A |
| 2009/0159388 | A1 * | 6/2009 | Scordino | F16H 45/02 192/3.29 |
| 2011/0135228 | A1 * | 6/2011 | Kaneko | B60G 15/068 384/420 |
| 2012/0193182 | A1 * | 8/2012 | Gurney | B23P 11/005 192/46 |
| 2013/0125538 | A1 * | 5/2013 | Frey | F16C 33/02 60/330 |
| 2015/0027110 | A1 * | 1/2015 | Lindemann | F16H 41/24 60/338 |
| 2015/0184701 | A1 * | 7/2015 | Lindemann | F16D 33/18 60/365 |
| 2015/0354683 | A1 * | 12/2015 | Nozawa | F16H 41/24 60/330 |

FOREIGN PATENT DOCUMENTS

| | | | | |
|---|---|---|---|---|
| JP | | 3657646 B2 * | 6/2005 | ............. F16C 33/30 |
| JP | | 2008240892 A | 10/2008 | |
| JP | | 2011236991 A * | 11/2011 | ............. F16H 41/24 |
| KR | | 20030032235 A * | 4/2003 | ............. F16B 43/00 |

* cited by examiner

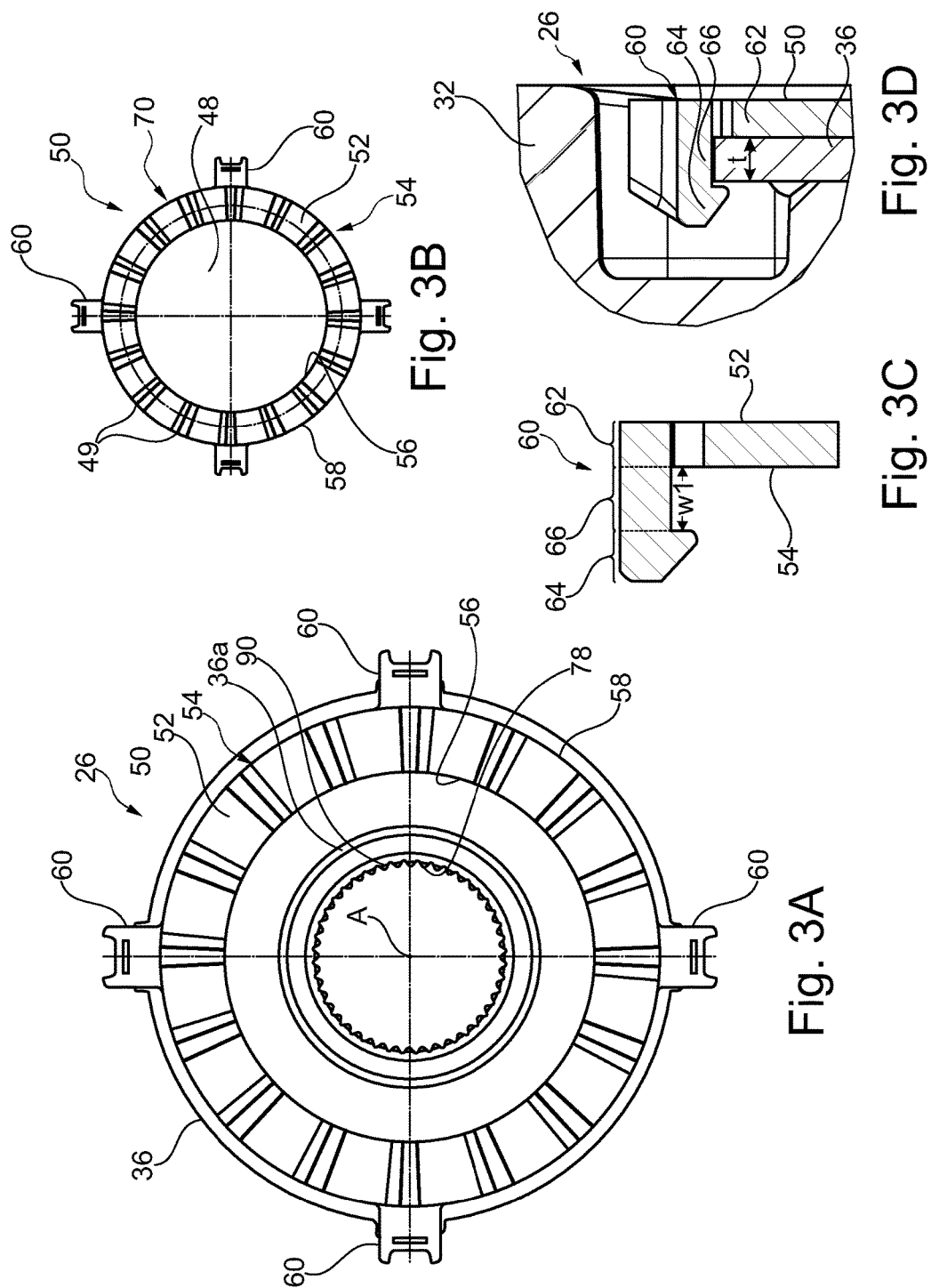

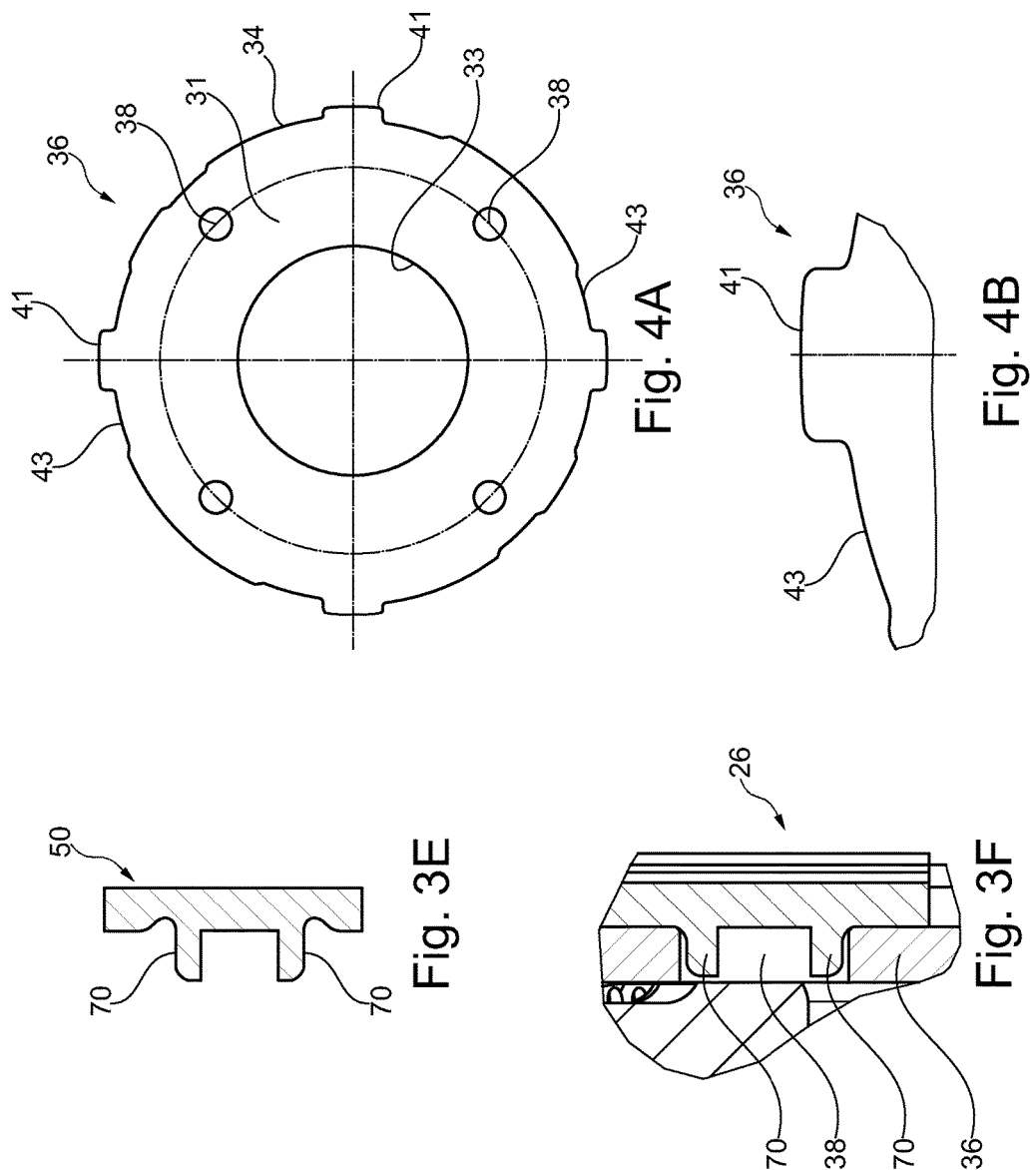

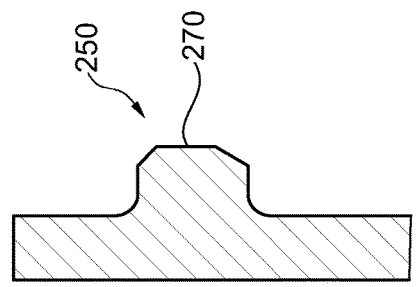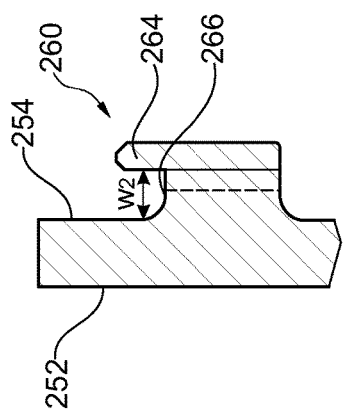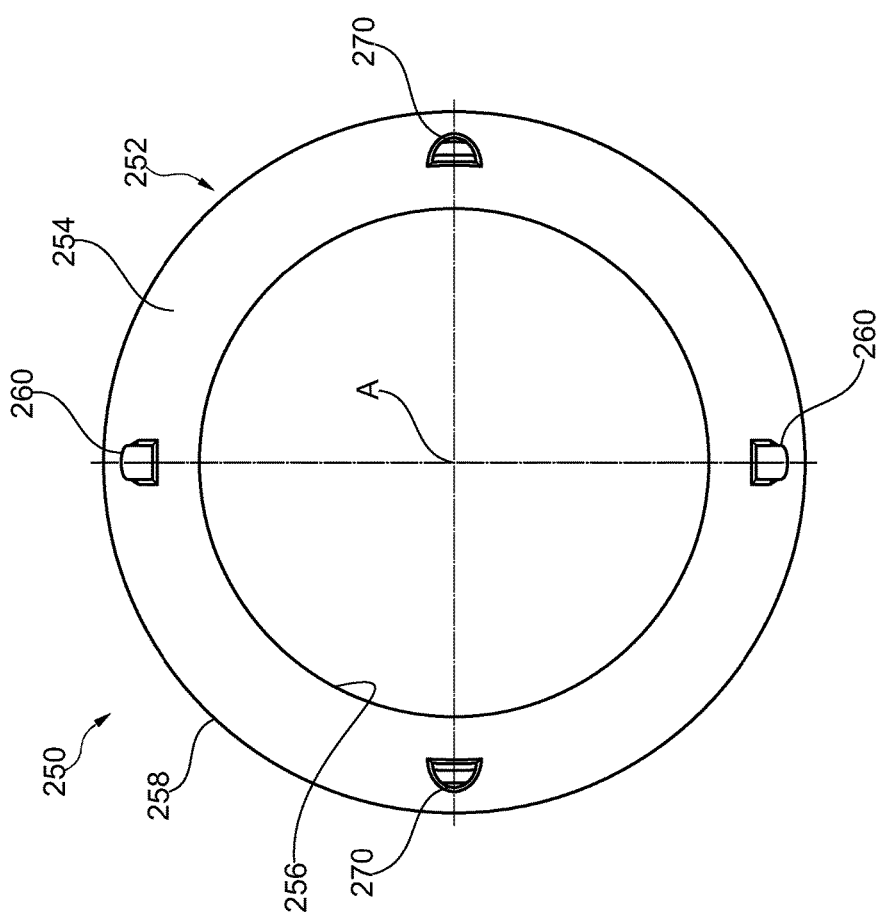

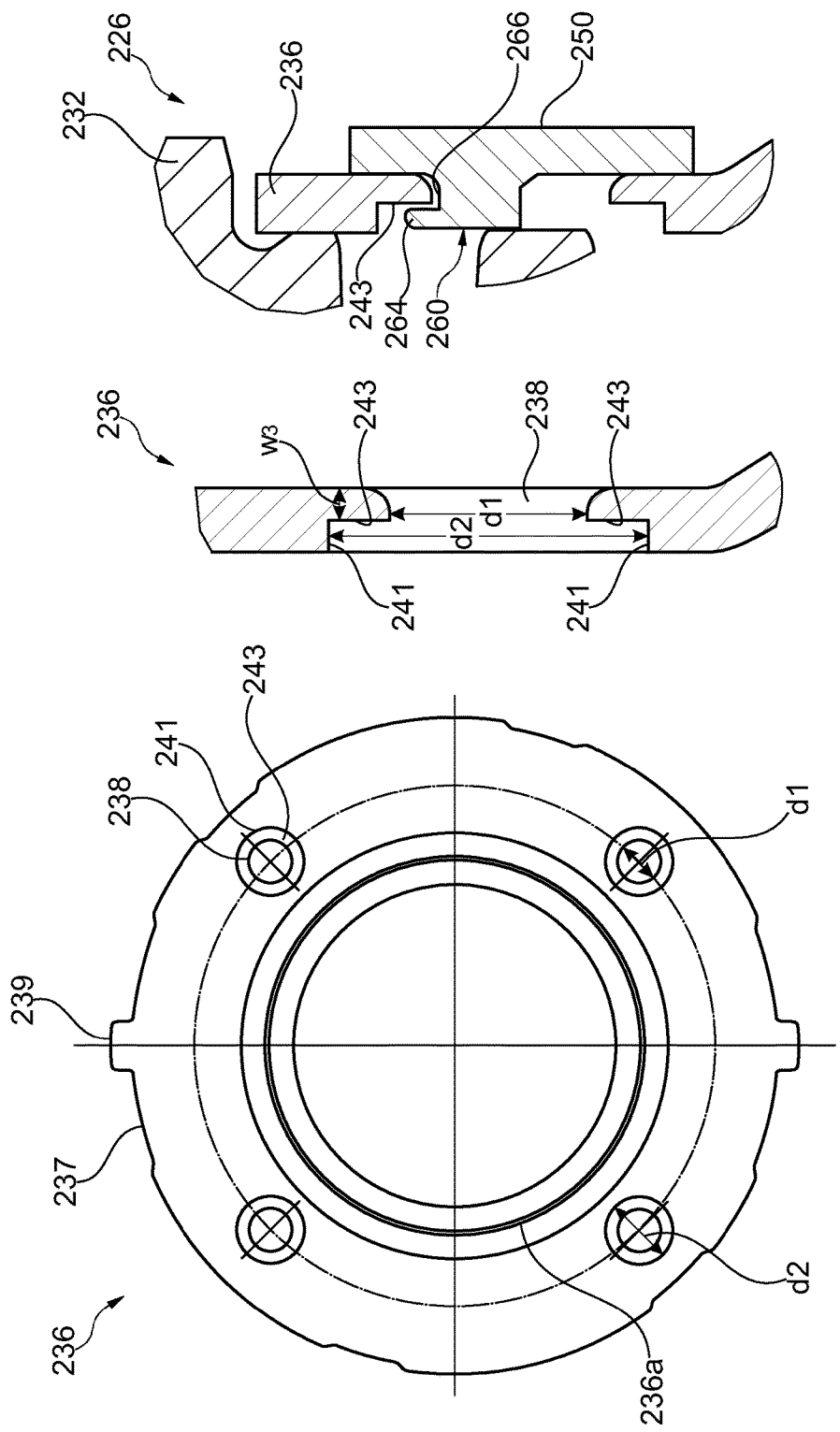

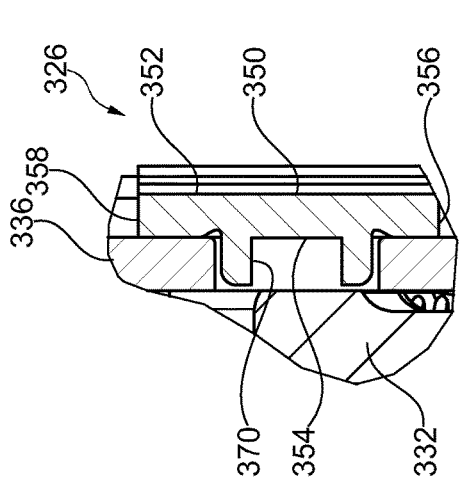
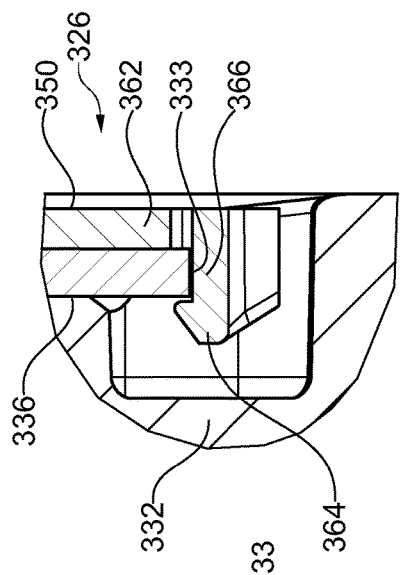
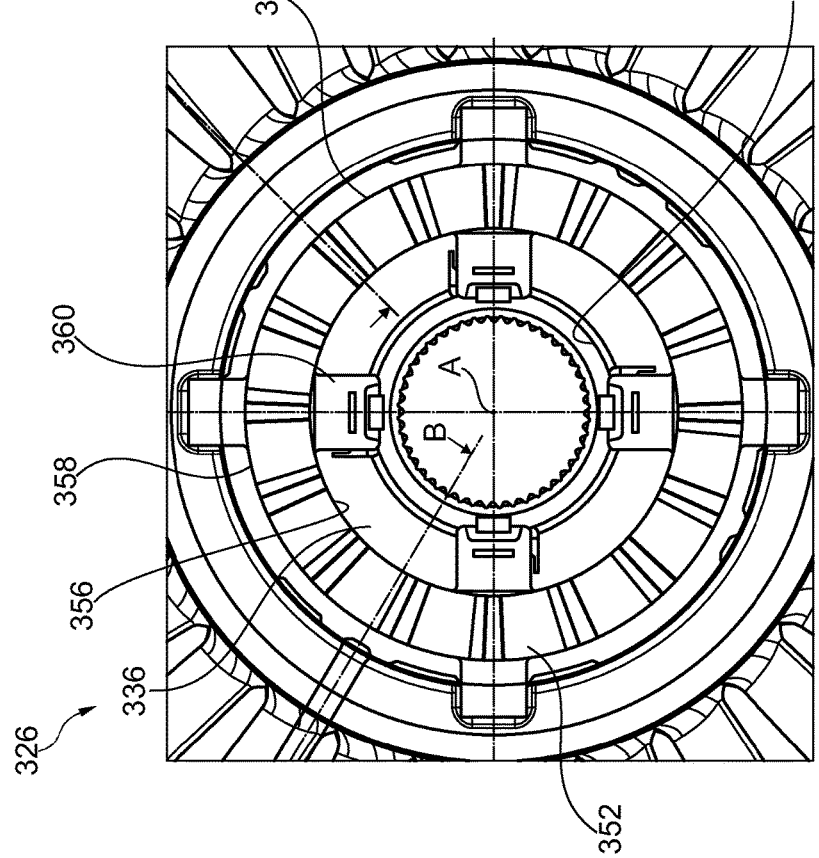

AXIAL RETENTION AND ANTI-ROTATION FEATURES FOR HYDRODYNAMIC THRUST BEARINGS

CROSS-REFERENCE TO RELATED APPLICATIONS

This application is the U.S. National Phase of PCT Appln. No. PCT/US2015/023531 filed Mar. 31, 2015, the entire disclosure of which is incorporated by reference herein.

FIELD

The invention relates generally to torque converters and more specifically to the axial retention of hydrodynamic thrust bearings or washers between stator side plates and impellers in torque converters.

BACKGROUND

U.S. Pat. No. 8,453,439, hereby incorporated by reference herein, discloses a torque converter including a washer for a thrust bearing.

U.S. patent application Ser. No. 14/566,924 filed Dec. 11, 2014, hereby incorporated by reference herein, discloses a torque converter including a stator thrust bearing.

BRIEF SUMMARY

Example aspects broadly comprise a hydrodynamic thrust bearing as provided. The hydrodynamic thrust bearing for a torque converter comprises: an axis of rotation; a first radial thrust surface; a second radial surface, opposite the first radial thrust surface, including at least two axially protruding anti-rotation pins for preventing relative motion with one of either a stator assembly or an impeller once assembled; an inner circumferential surface defining an opening concentric with the axis of rotation; an outer circumferential surface; and, an axial retention means for attaching to the one of either a stator assembly or an impeller and including at least two resilient tabs, each tab comprising: a deflectable portion; a lockable portion; and, an axial portion having a first width and connecting the deflectable portion and the lockable portion.

Example aspects broadly comprise a torque converter as provided. The torque convert comprises: an axis of rotation; a stator assembly including a side plate having a first radial surface and a thickness; a turbine including a plurality of blades; an impeller including a plurality of blades and an impeller shell having a second radial surface facing the stator side plate first radial surface; a hydrodynamic thrust bearing, disposed between the stator side plate and the impeller shell, and comprising: a thrust surface facing one of the first radial surface or the second radial surface with a fluid pathway therebetween; a supporting surface opposite the thrust surface and facing the other of the first radial surface or the second radial surface; an inner circumferential surface defining an opening concentric with the axis of rotation; an outer circumferential surface; and, an axial retention means for attaching to the stator side plate or the impeller further including at least two resilient tabs, each tab comprising: a deflectable portion; a lockable portion; and, an axial portion having a first width and connecting the deflectable portion and the lockable portion.

Other example aspects broadly comprise a torque converter comprising: an axis of rotation; a turbine having a plurality of blades; an impeller having: a plurality of blades; and, an impeller shell including: an inner surface, an outer surface, and a thickness therebetween; an impeller neck forming an opening concentric with the axis of rotation including: a first circumferential surface having a first width at most equal to the thickness; a second circumferential surface disposed radially and axially outward with respect to the first circumferential surface; and, a first radial surface connecting the first and second circumferential surfaces; a stator assembly disposed between the turbine and the impeller; a hydrodynamic thrust bearing, disposed between the stator assembly and the impeller shell, comprising: a thrust surface facing the stator assembly with a fluid pathway therebetween; a supporting surface opposite the thrust surface and facing the impeller inner surface; and, an axial retention means for attaching to the impeller shell neck including at least two resilient tabs, each tab comprising: a deflectable portion; a lockable portion; and, an axial portion having a second width and connecting the deflectable portion and the lockable portion, wherein the second width is at least equal to the first width.

Other example aspects broadly comprise a hydrodynamic thrust bearing assembly for a torque converter comprising: a stator side plate; and the hydrodynamic thrust bearing as recited above and attached to the stator side plate or an impeller.

Other example aspects broadly comprise a stator assembly comprising: an axis of rotation; a stator including a plurality of blades; a one-way clutch; a stator side plate for holding the one-way clutch in place within the stator assembly; and, the hydrodynamic thrust bearing as recited above, disposed between the stator side plate and an impeller and attached to the stator side plate or the impeller.

In an example aspect, the supporting surface of the hydrodynamic thrust bearing as in any of the above paragraphs further includes at least two axially protruding anti-rotation pins for preventing relative motion with one of either a stator assembly or an impeller once assembled.

In an example aspect, the thrust surface of the hydrodynamic thrust bearing as in any of the above paragraphs further includes grooves extending from the inner circumferential surface to the outer circumferential surface.

In an example aspect, the torque converter as in as in any of the above paragraphs wherein the stator side plate further includes a pocket for receiving the axial retention means of the hydrodynamic thrust bearing.

In an example aspect, the stator side plate as recited above further includes holes for receiving the anti-rotation pins.

In an example aspect, the axial portion width of the hydrodynamic thrust bearing as recited above is at least equal to the stator side plate thickness. In an example aspect, the stator side plate further includes an inner diameter and an outer diameter. In an example aspect, the stator side plate further includes tabs on the inner diameter, the outer diameter, or both.

BRIEF DESCRIPTION OF THE DRAWINGS

The nature and mode of operation of the present invention will now be more fully described in the following detailed description of the invention taken with the accompanying drawing figures, in which:

FIG. 3A illustrates a top view of an assembly including a hydrodynamic thrust bearing mounted on a side plate for use between an impeller and a stator in accordance with an example aspect; FIG. 3B illustrates a top view of the hydrodynamic thrust bearing of FIG. 3A; FIG. 3C is a partial cross-section view of an axial retention feature included in the hydrodynamic thrust bearing according to an example aspect; FIG. 3D is a partial cross-sectional view of the axial retention feature of the thrust bearing mating with a side plate according to an example aspect; FIG. 3E is a partial cross-sectional view of an anti-rotation feature included in the hydrodynamic thrust bearing according to an example aspect; and, FIG. 3F is a partial cross-sectional view of the anti-rotation feature of the thrust bearing mating with a side plate hole according to an example aspect;

FIG. 4A illustrates a top view of a side plate in accordance with an example aspect, and FIG. 4B illustrates a partial cross-sectional top view of the side plate in FIG. 4A including a tab;

FIG. 6A illustrates a back view of a hydrodynamic thrust bearing in an alternative embodiment with axial retention features as shown in partial cross-sectional view of FIG. 6B and anti-rotation features as shown in partial cross-section view of FIG. 6C in accordance with an example aspect;

FIG. 7A illustrates a top view of a side plate for mating with the hydrodynamic thrust bearing of FIGS. 6A-6C; FIG. 7B illustrates a cross-sectional side view the side plate of FIG. 7A in accordance with an example aspect; and FIG. 7C illustrates a partial cross-sectional side view of a stator assembly including the thrust bearing of FIG. 6A and the axial retention feature of FIG. 6B according to an example aspect;

FIG. 8A illustrates a partial top view of a stator assembly of a torque converter in another alternative embodiment including a hydrodynamic thrust bearing including tabs to clamp onto the side plate inner diameter in an alternative embodiment in accordance with an example aspect; FIG. 8B illustrates thrust bearing anti-rotation features on back of thrust bearing of FIG. 8A according to an example aspect; and FIG. 8C illustrates a partial cross-sectional side view of the thrust bearing clamping to the side plate inner diameter;

DETAILED DESCRIPTION

Figure 1:
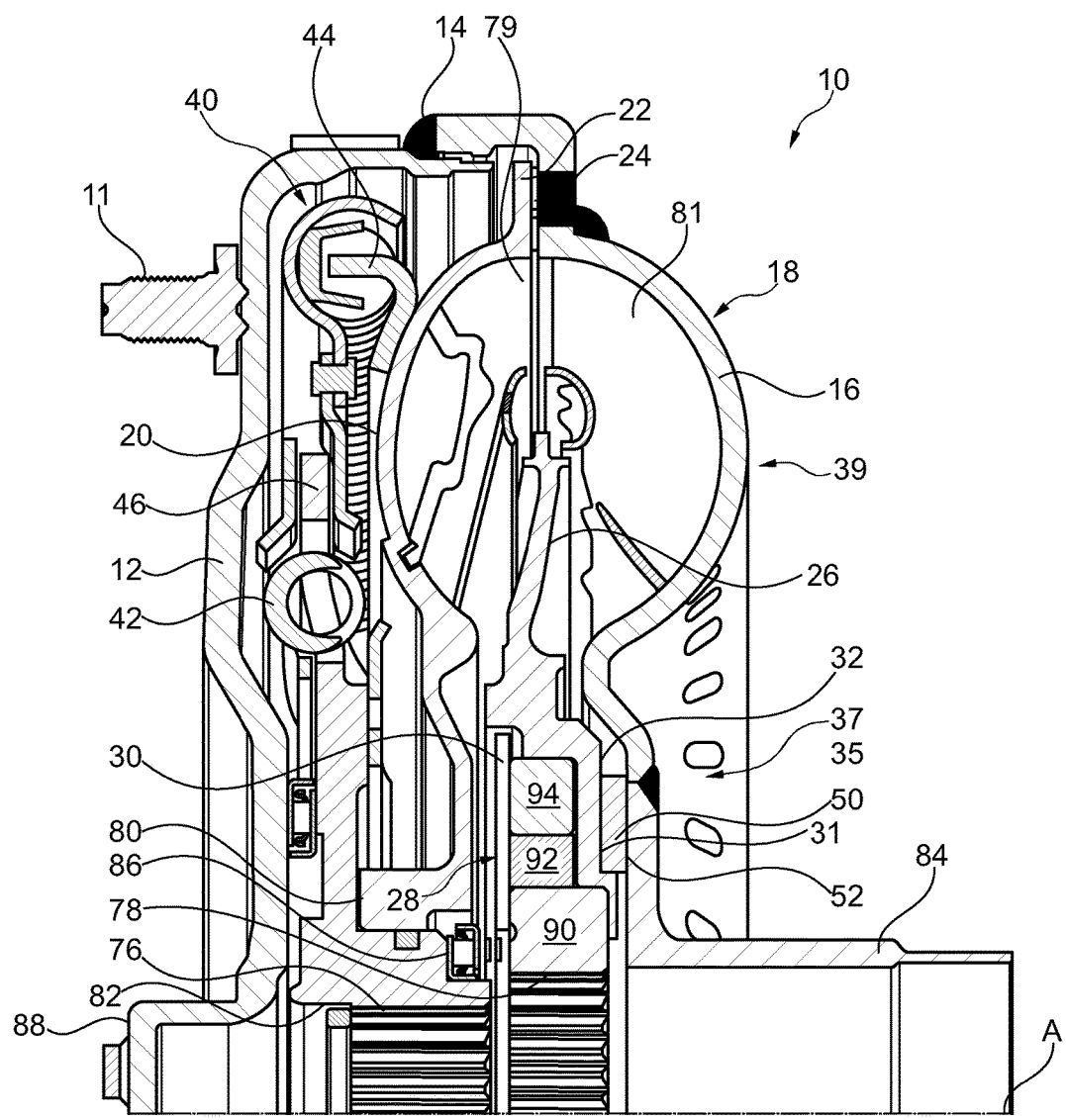
FIG. 1 illustrates a partial cross-sectional side view of a torque converter in accordance with an example aspect.

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

The present disclosure provides a hydrodynamic thrust bearing including retention features to secure the thrust bearing to a stator side plate or to an impeller, for example. Herein, the term 'hydrodynamic thrust bearing' may also be referred to interchangeably as 'hydrodynamic bearing', 'thrust bearing', 'thrust washer', or simply as 'bearing' or 'washer'. In some torque converter designs particularly as the stator moves towards the turbine in coast mode, as those skilled in the art recognize, axial retention features are required to secure the hydrodynamic bearing to ensure that it does not fall off in the torque converter. Furthermore, anti-rotation features are required to prevent the thrust bearing's relative motion with respect to the side plate. Previous solutions such as staking of the hydrodynamic bearing on the stator side plate are undesirable. The staking operation involves tooling and controlled staking force to ensure the hydrodynamic bearing does not fall in the torque converter.

As one skilled in the art appreciates, the bearing disclosed may be integrated into or otherwise affixed to a side plate supporting a stator (also referred to interchangeably herein as a stator side plate) or, alternatively, may be attached to an impeller. In an example aspect, the bearing is attached to the stator side plate using snap features integrated into the bearing or by other methods for attachment as known by those skilled in the art. Without being bound by theory, it is believed that the generation of a pressure wave in the hydrodynamic bearing disclosed herein includes fluid adhering to the bearing surface, which is dragged into a thin converging wedge by high shear forces, and then high pressure builds up in the fluid film to allow fluid to escape through the thin clearance between the bearing thrust surface and the mating surface. The bearing advantageously maintains at least one hydrodynamic pressure region on the bearing surface that prevents the bearing surface from coming into contact with the mating surface, for example, the impeller inner surface in an example aspect or the side plate in another example aspect.

The following description is made with reference to FIGS. 1-10. In an example aspect, the hydrodynamic thrust bearing may be formed by known methods in the art such as non-limiting examples injection molding, machining, or profile extrusion. The hydrodynamic bearing is deflectable and is made of plastic or other suitable material, for example, with good mechanical properties, wear resistance, and ample flexibility. In an example aspect, the hydrodynamic bearing is made of polyamide-imide (PAI). In an example aspect, polyamide-imide such as Torlon® is used. In a non-limiting example aspect, the hydrodynamic bearing is made of Torlon® 4275. In another non-limiting example aspect, the hydrodynamic bearing is made of Torlon® 4301.

FIG. 1 illustrates a partial cross sectional side view of a torque converter including a hydrodynamic thrust bearing according to an example aspect. Torque converter 10 includes front cover 12 for connecting to a crankshaft of an internal combustion engine via stud 11 and rear cover 16, also referred to as impeller shell interchangeably herein, for an impeller 18. Impellers are also referred to in the art interchangeably as 'pump'. Front cover 12 and rear cover 16 are fastened together via weld 14. Cover 12 is fixed to cover pilot 88. Torque converter 10 also includes turbine 20, turbine shell 22, and stator 26 disposed between turbine 20 and impeller 18. Turbines and impellers, as is known in the art, include a plurality of blades 79 and 81, respectively. Friction material 24 is optionally disposed between turbine shell 22 and impeller shell 16 as shown.

Torque converter 10 includes one-way clutch 28, which supports stator 26, and includes inner race 90, roller 92, outer race 94, and springs (not shown) for example. Alternatively, one-way clutch 28 may comprise an inner race and a rocker as is known in the art, for example. Centering plate 30 holds one-way clutch 28 in place within stator 26. Stator 26, also referred to herein interchangeably as stator assembly 26, includes base 32 and a thrust bearing 50 adjacent base 32 having a thrust bearing surface 52 that faces impeller shell 16 as shown in FIG. 1. Thrust bearing surface 52 is interchangeably herein referred to as thrust surface, first bearing surface, or the surface of hydrodynamic high pressure. Bearing surface 52 is shaped so as to maintain a hydrodynamic film that prevents bearing surface 52 from contacting impeller shell 16. Specifically, thrust bearing surface 52 axially faces axial inner surface 35 of radially extending portion 37 of impeller shell 16 that is between rounded or torus portion 39 supporting blades 81 of impeller 18 and hub 84 of of impeller 18. Alternatively, thrust bearing surface faces stator base 32 and, therefore, a hydrodynamic film is maintained that prevents bearing surface 52 from contacting the stator assembly in another example aspect. Torque converter 10 also includes damper assembly 40, which is connected to and drivable by turbine 20, and is positioned between turbine 20 and front cover 12. Damper assembly 40 includes spring 42, flange 46, and drive tab 44 fixed to turbine shell 22.

Torque converter 10 includes hydrodynamic thrust bearing 50 as will be described in greater detail in FIGS. 2-10. Torque converter 10, as shown in FIG. 1, further includes turbine hub 80 fixed to flange 46, bearing 86, and flange hub 82. Hub 80 is sealed to flange hub 82. Flange hub 82 is splined via spines 76 to a transmission input shaft (not shown) and inner race 90 is splined via splines 78 to a stator shaft (not shown). Torque converter 10 includes axis of rotation A, also simply referred to as axis A.

Figure 2:
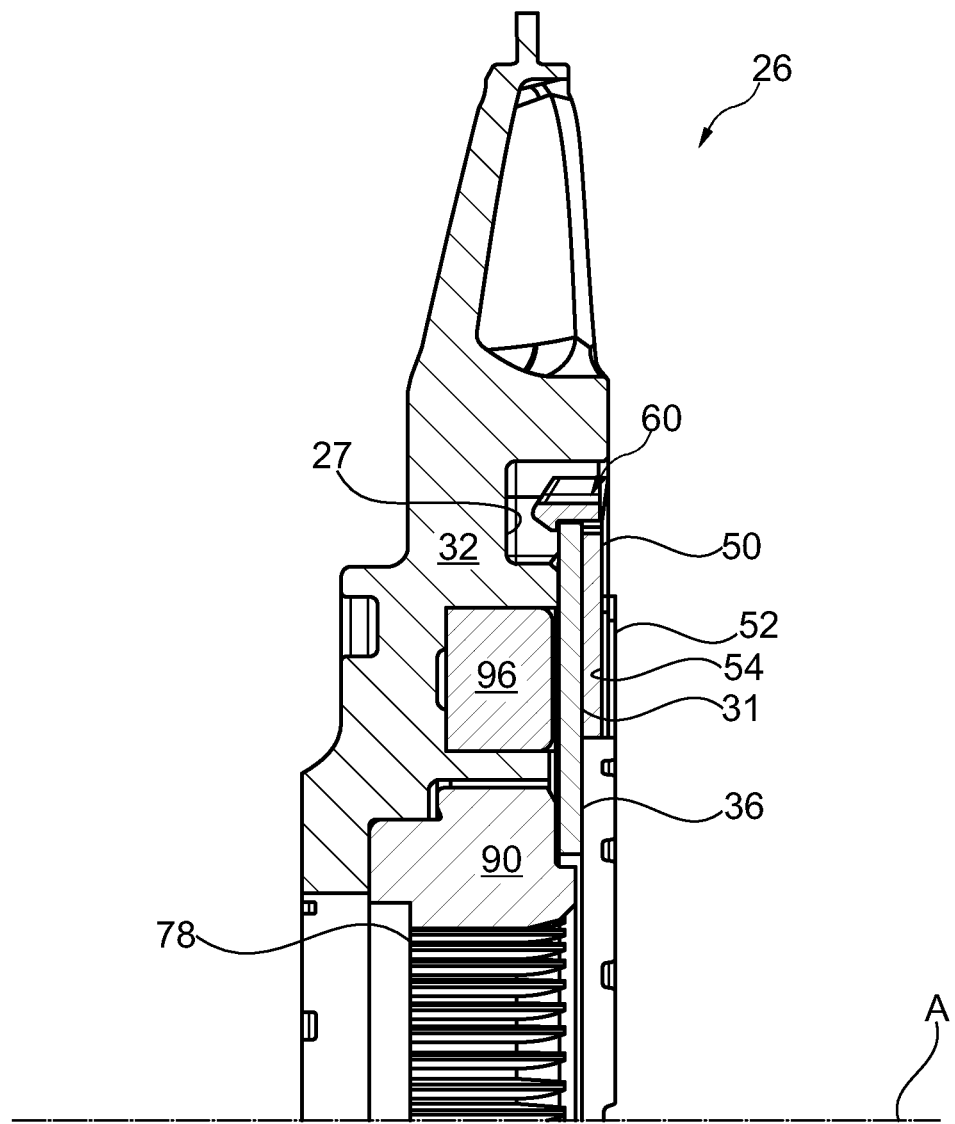
FIG. 2 illustrates a partial cross-sectional side view of a stator assembly for a torque converter in accordance with an example aspect.

FIG. 2 shows a partial cross-sectional side view of stator assembly 26 in a torque converter in accordance with an example aspect. In an example aspect, stator assembly 26 includes a one-way clutch including rocker 96 and inner race 90. Stator assembly 26 further includes pocket 27, splines 78, side plate 36, hydrodynamic thrust bearing 50, and axis of rotation A. Pocket 27 makes space to accommodate axial retention means 60 of bearing 50 to fit within stator assembly 26. Bearing 50 includes thrust surface 52 and supporting surface 54, which faces side plate radial surface 31.

FIG. 3A illustrates a top view of a stator assembly including a hydrodynamic thrust bearing 50 mounted on side plate 36 for use between an impeller and a stator in accordance with an example aspect. Stator assembly 26 includes hydrodynamic thrust bearing 50 having first radial thrust surface 52 and second radial surface 54, which is opposite first radial thrust surface 52. Bearing 50 further includes inner circumferential surface 56 and outer circumferential surface 58, and at least two resilient tabs 60. Stator assembly 26 further includes side plate 36 and inner race 90 including splines 78. FIG. 3B illustrates a top view of hydrodynamic thrust bearing 50 of FIG. 3A having first radial thrust surface 52, second radial surface 54, inner circumferential surface 56, outer circumferential surface 58, and resilient tabs 60. Resilient tabs 60 are also referred to interchangeably herein as axial retention means 60. Resilient tabs 60 are disposed, in a non-limiting example aspect, radially outward with respect to outer circumferential surface 58. Anti-rotation means may alternatively be disposed between inner circumferential surface 56 and outer circumferential surface 58 (as shown in FIG. 3E), or radially inward with respect to inner circumferential surface 56. Hydrodynamic thrust bearing 50 further includes anti-rotation pins 70 protruding from second radial surface 54 and disposed radially between inner circumferential surface 56 and outer circumferential surface 58. Anti-rotation pins 70 are also referred to interchangeably herein as anti-rotation features 70. Alternatively, anti-rotation features 70, 170 may be disposed integrally within axial retention features 60, 160, as shown for example in FIG. 5A.

FIG. 3C is a partial cross-section view of an axial retention feature integral with hydrodynamic thrust bearing 50 according to an example aspect having resilient tab 60 including first radial thrust surface 52, second radial surface 54, deflectable portion 62, which is a radially extending portion, lockable portion 64, and axial portion 66 having width w1 and connecting deflectable portion 62 to lockable portion 64. FIG. 3D is a partial cross-sectional view of stator assembly 26 including thrust bearing 50 having axial retention means resilient tab 60 mating with side plate 36 having thickness t according to an example aspect. Width w1 of axial portion 66 is at least equal to thickness t of side plate 36. Side plate 36 is adjacent to stator base 32.

FIG. 3E is a partial cross-sectional view of hydrodynamic thrust bearing 50 including anti-rotation feature 70, also referred to interchangeably herein as anti-rotation pins 70. The pins 70 may be rounded, square, or irregularly shaped provided they mate with holes in side plate 36 so that bearing 50 does not rotate with respect to the side plate in an example aspect. Alternatively, where bearing 50 is attached to an impeller, for example, the bearing includes anti-rotation pins 70 to mate with suitably matched depressions within the inner surface of the impeller. FIG. 3F is a partial cross-sectional view of anti-rotation feature 70 of thrust bearing 50 mating with side plate 36 hole 38 according to an example aspect.

Referring to FIGS. 1 through 4B, hydrodynamic thrust bearing 50 for torque converter 10 is shown in an example aspect comprising axis of rotation A, first radial thrust surface 52, second radial surface 54, opposite to first radial thrust surface 52, including at least two axially protruding anti-rotation pins 70 for preventing relative motion with one of either a stator assembly or an impeller once assembled. Hydrodynamic thrust bearing 50 further comprises inner circumferential surface 56 defining opening 48 concentric with axis of rotation A, outer circumferential surface 58, and, axial retention means 60 for attaching to the one of either a stator assembly or an impeller. Axial retention means 60 includes at least two resilient tabs 60, each tab comprising deflectable portion 62 extending in a radial direction inward toward opening 48, lockable portion 64, and axial portion 66 having width w1 and connecting deflectable portion 62 and lockable portion 64.

In an example aspect, hydrodynamic thrust bearing 50 is part of a hydrodynamic thrust bearing assembly for a torque converter comprising stator side plate 36, wherein hydrodynamic thrust bearing is attached to stator side plate 36 or, in another example aspect, to an impeller. In another example aspect, hydrodynamic thrust bearing 50 is part of a stator assembly 26 comprising axis of rotation A, the stator including base 32 and a plurality of blades, one-way clutch 28, and stator side plate 36 for holding one-way clutch 28 in place within stator assembly 26; wherein hydrodynamic thrust bearing 50 is disposed between stator side plate 36 and impeller 18 and is attached to stator side plate 36 or, in yet another example aspect, to impeller 18. In an example aspect, width w1 of axial portion 66 is at least equal to thickness t of stator side plate 36. In an example aspect, thrust surface 52 of hydrodynamic thrust bearing 50 further includes grooves 49 extending from inner circumferential surface 56 to outer circumferential surface 58. In an example aspect, stator side plate 36 further includes pocket 27 for receiving axial retention means 60 and contoured portion 36a for centering hydrodynamic thrust bearing 50.

In an example aspect, stator side plate 36 further includes holes 38 for receiving the anti-rotation pins 70 of hydrodynamic thrust bearing 50. FIG. 4A illustrates a top view of side plate 36 including holes 38, for mating with anti-rotation features 70 of hydrodynamic bearing 50, and rigid tabs 41, for mating with axial retention features 60 of hydrodynamic bearing 50. Side plate 36 includes cutouts 43 for manufacturability and assembly and may vary in shape and size accordingly. FIG. 4B illustrates a partial cross-sectional top view of side plate 36 of FIG. 4A having rigid tabs 41 and cutouts 43. Resilient tabs 60 of hydrodynamic thrust bearing 50 snap fit to rigid tabs 41 of side plate 36. In an example aspect, stator side plate 36 further includes inner diameter 33 and outer diameter 34. In an example aspect, stator side plate 36 further includes tabs 41 extending radially outward from outer diameter 34 as in FIG. 4A, or in other example aspects extending from inner diameter 33, or in yet other example aspects extending from both.

In an example aspect, referring again to FIGS. 1 through 4B, torque converter 10 comprises axis of rotation A, stator assembly 26 including side plate 36 having radial surface 31 and thickness t, turbine 20 including plurality of blades 79, and impeller 18 including plurality of blades 81 and impeller shell 16 having radial surface 35 facing stator side plate radial surface 31. Torque converter 10 further comprises hydrodynamic thrust bearing 50, disposed between stator side plate 36 and impeller shell 16, wherein thrust bearing 50 comprises thrust surface 52 facing one of radial surface 31 of stator side plate 36 or radial surface 35 of impeller 18 with a fluid pathway therebetween. In the example of FIG. 1, hydrodynamic thrust bearing 50 has thrust surface 52 facing impeller shell radial surface 35. Hydrodynamic thrust bearing 50 further includes supporting surface 54 opposite thrust surface 52. Supporting surface 54 is facing the other of first radial surface 31 or second radial surface 35. In the example of FIG. 2, hydrodynamic thrust bearing 50 has supporting surface 54 facing stator side plate radial surface 31. Hydrodynamic thrust bearing 50 further includes inner circumferential surface 56 defining opening 48 concentric with axis of rotation A, outer circumferential surface 58, and, axial retention means 60 for attaching to the one of either a stator assembly or an impeller. Axial retention means 60 includes at least two resilient tabs 60, each tab comprising deflectable portion 62 extending in a radial direction inward toward opening 48, lockable portion 64, and axial portion 66 having width w1 and connecting deflectable portion 62 and lockable portion 64. In an example aspect, axial portion 66 width w1 is at least equal to stator side plate 36 thickness t.

In an example aspect, hydrodynamic thrust bearing 50 of torque converter 10 further includes at least two axially protruding anti-rotation pins 70 for preventing relative motion with one of either stator assembly 26 or impeller 18 once assembled. In an example aspect, stator side plate 36 further includes holes 38 for receiving the anti-rotation pins 70 of hydrodynamic thrust bearing 50. In an example aspect, thrust surface 52 of hydrodynamic thrust bearing 50 further includes grooves 49 extending from inner circumferential surface 56 to outer circumferential surface 58. In an example aspect, stator side plate 36 further includes contoured portion 36a for centering hydrodynamic thrust bearing 50.

Figure 5B:
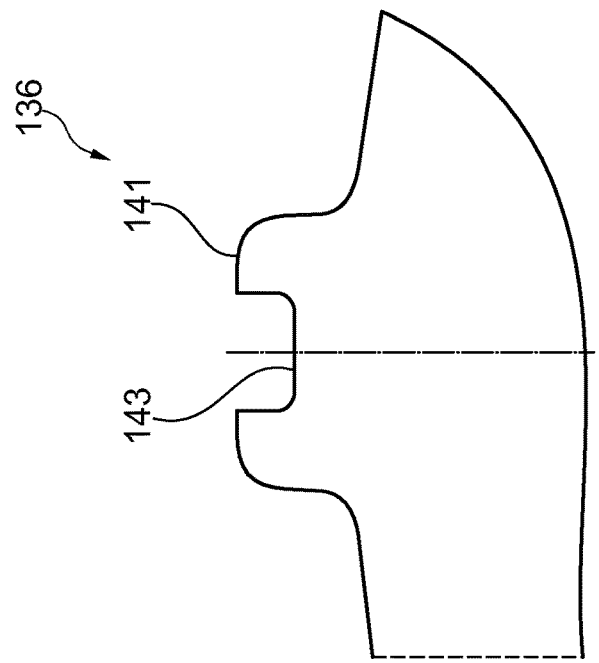
FIG. 5B illustrates a partial view of a side plate tab for mating with the hydrodynamic thrust washer of FIG. 5A.
Figure 5A:
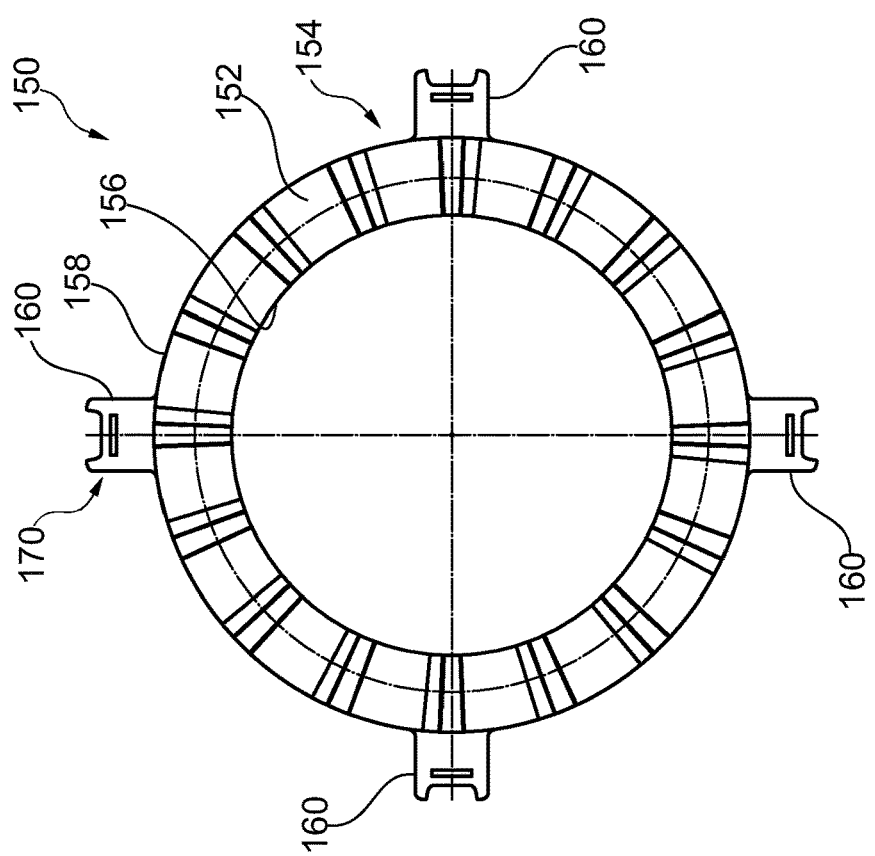
FIG. 5A illustrates a top view of a hydrodynamic thrust washer in an alternative embodiment with anti-rotation feature and axial retention feature both included in tabs in accordance with an example aspect.

FIG. 5A illustrates a top view of a hydrodynamic thrust washer in an alternative embodiment with anti-rotation features and axial retention features both built into tabs in accordance with an example aspect. FIG. 5A illustrates a top view of hydrodynamic thrust bearing 150 having first radial thrust surface 152, second radial surface 154, inner circumferential surface 156, outer circumferential surface 158, and resilient tabs 160. Resilient tabs 160 also include anti-rotation pins 170 protruding from second radial surface 154. FIG. 5B illustrates a partial view of side plate 136 having rigid tab 141 including notch 143 for mating with the hydrodynamic thrust washer 150 of FIG. 5A.

FIG. 6A illustrates a back view of hydrodynamic thrust bearing 250 in an alternative embodiment having radial surface 254, thrust surface 252 (opposite to radial surface 254), inner circumferential surface 256, outer circumferential surface 258, and at least two resilient tabs 260. Resilient tabs 270, as shown in partial cross-sectional view of FIG. 6B in accordance with an example aspect, include deflectable portion 264, which also serves as the lockable portion, and axial portion 266 having width w2 connecting deflectable portion 264 to radial surface 254. Hydrodynamic thrust bearing 250 further includes at least two anti-rotation features 270, as shown in partial cross-section view of FIG. 6C. Axial retention features 260 and anti-rotation features 270 are disposed radially between inner circumferential surface 256 and outer circumferential surface 258.

FIG. 7A illustrates a top view of a side plate for mating with hydrodynamic thrust bearing 250 of FIGS. 6A-6C. FIG. 7A shows side plate 236 having holes 238, for mating with axial retention features 260 or anti-rotation features 270 of hydrodynamic bearing 250. Holes 238 have diameter d1. Side plate 236 includes snap portions 241 having diameter d2 and radial portion 243. Side plate 236 further includes cutouts 237 for manufacturability and assembly and tabs 239 for positioning during assembly. Diameter d2 is at least equal to diameter d1 in an example aspect. More particularly, diameter d2 is greater than diameter d1. In an example aspect, stator side plate 236 further includes contoured portion 236a for centering hydrodynamic thrust bearing 250. FIG. 7B illustrates a cross-sectional side view the side plate of FIG. 7A in accordance with an example aspect to better illustrate the snap portion for mating with axial retention features 260 of bearing 250. Side plate 236 includes holes 238 having diameter d1, radial portion 243 having width w3, and snap portion 241 having diameter d2. FIG. 7C illustrates a partial cross-sectional side view of stator assembly 226 including thrust bearing 250 of FIG. 6A and the axial retention feature of FIG. 6C according to an example aspect. Deflectable portion 264 flexes to fit radial portion 243 having width w3 within axial portion 266 having width w2. Width w2 is at least equal to width w3; in some example aspects, width w2 is greater than width w3. Anti-rotation means 270 fits easily within hole 238 having diameter d1.

FIG. 8A illustrates a partial top view of stator assembly 326 of a torque converter including hydrodynamic thrust bearing 350 including axial retention features 360 to clamp onto side plate inner diameter 333 in an alternative embodiment in accordance with an example aspect. Stator assembly 326 includes hydrodynamic thrust bearing 350 having thrust surface 352, inner circumferential surface 356, outer circumferential surface 358, and axial retention features 360 disposed radially inward with respect to inner circumferential surface 356. Stator assembly 326 further includes side plate 336 having inner diameter 333. Hydrodynamic thrust bearing 350 is concentric with stator assembly 326 and axis of rotation A. Axial retention features 360 snap fit onto side plate inner diameter 333. FIG. 8B illustrates thrust bearing anti-rotation features 370 protruding from opposite surface 354 of thrust bearing 350 between inner circumferential surface 356 and outer circumferential surface 358 according to an example aspect. FIG. 8C illustrates a partial cross-sectional side view of thrust bearing 350 clamping onto or snap fitting to side plate 336 having inner diameter 333. Hydrodynamic thrust bearing 350 includes axial retention means 360 having radial portion 362, lockable portion 364, and axial portion 366. Lockable portion 364 secures to side plate 336.

Figure 9:
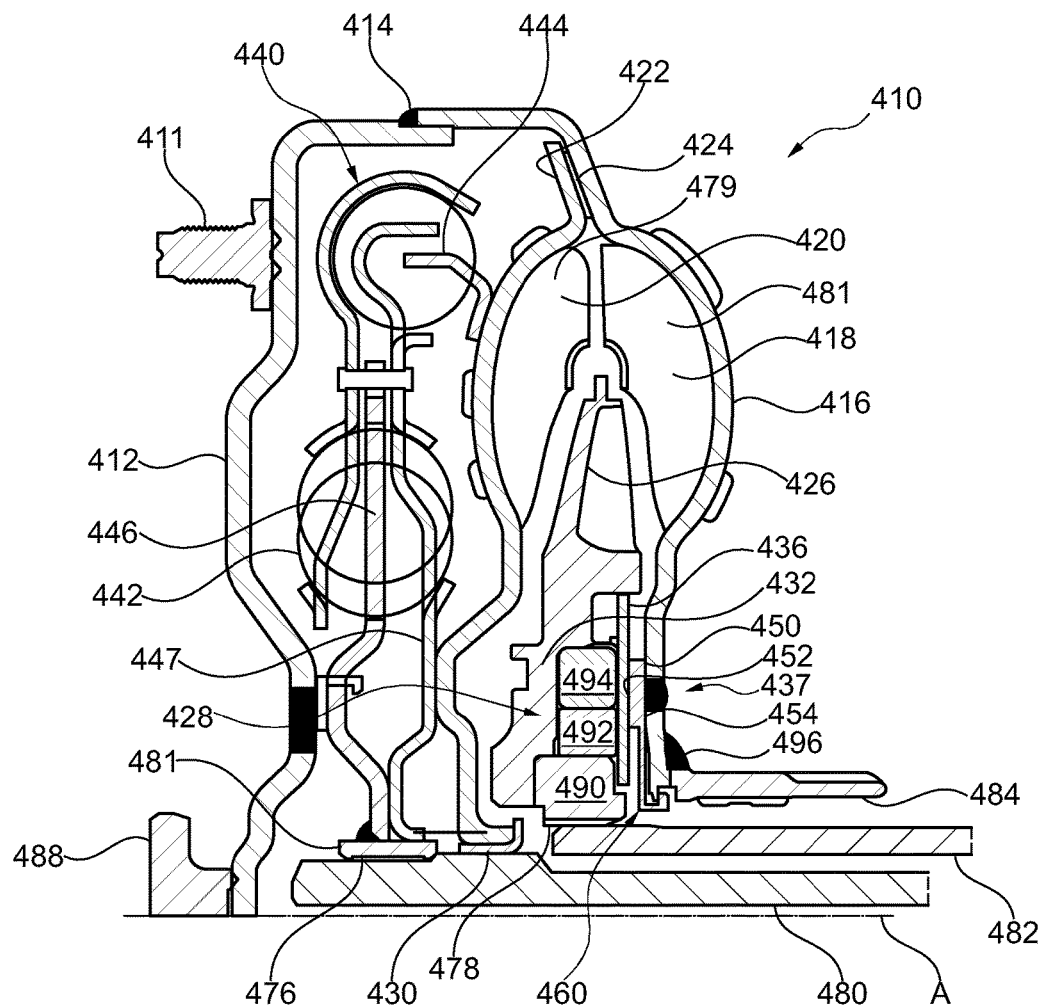
FIG. 9 illustrates another alternative embodiment of a partial cross-sectional side view of a torque converter with a hydrodynamic thrust bearing attached to an impeller in in accordance with an example aspect; and, FIG. 10 illustrates a partial cross-sectional side view of a stator assembly in a torque converter as in FIG. 9 in accordance with an example aspect.

FIG. 9 illustrates another alternative embodiment of a partial cross-sectional side view of a torque converter wherein a hydrodynamic thrust bearing is attached to an impeller in in accordance with an example aspect. Torque converter 410 includes front cover 412 for connecting to a crankshaft of an internal combustion engine via stud 411 and rear cover 416 for an impeller 418. Front cover 412 and rear cover 416 are fastened together via weld 414. Cover 412 is fixed to cover pilot 488. Torque converter 410 also includes turbine 420, turbine shell 422, stator 426 between turbine 420 and impeller 418. Turbines and impellers, as is known in the art, include a plurality of blades. Impeller 418 is fixed to impeller hub 484 at weld 496.

Torque converter 410 includes one-way clutch 428, which supports stator 426, and includes inner race 490, roller 492, outer race 494, and springs (not shown), for example. Alternatively, one-way clutch 428 may comprise an inner race and a rocker as is known in the art, for example. Stator 426, also referred to herein interchangeably as stator assembly 426, includes base 432 and a thrust bearing 450 adjacent base 432 having a thrust bearing surface 452 that faces side plate 436 and stator base 432 as shown in FIG. 9. Thrust bearing surface 452 is shaped so as to maintain a hydrodynamic film that prevents bearing surface 452 from contacting side plate 436. Opposite bearing surface 454 faces impeller shell 416, specifically radial portion 437 of impeller shell. Torque converter 410 also includes damper assembly 440, which is connected to and drivable by turbine 420, and is positioned between turbine 420 and front cover 412. Damper assembly 440 includes spring 442, flange 446, and drive tab 444 fixed to turbine shell 422.

Torque converter 410, as shown in FIG. 9, further includes cover plate 447 fixed to flange 446 and turbine shell 422. Bushing 430 positions and at least partially seals turbine shell 422 on transmission input shaft 482. Flange hub 481 supports and at least partially seals flange 446 and cover plate 447 and is splined to transmission input shaft 480 at splines 476. Inner race 490 is splined via splines 478 to stator shaft 482. Torque converter 410 includes axis of rotation A, also simply referred to as axis A.

Figure 10:
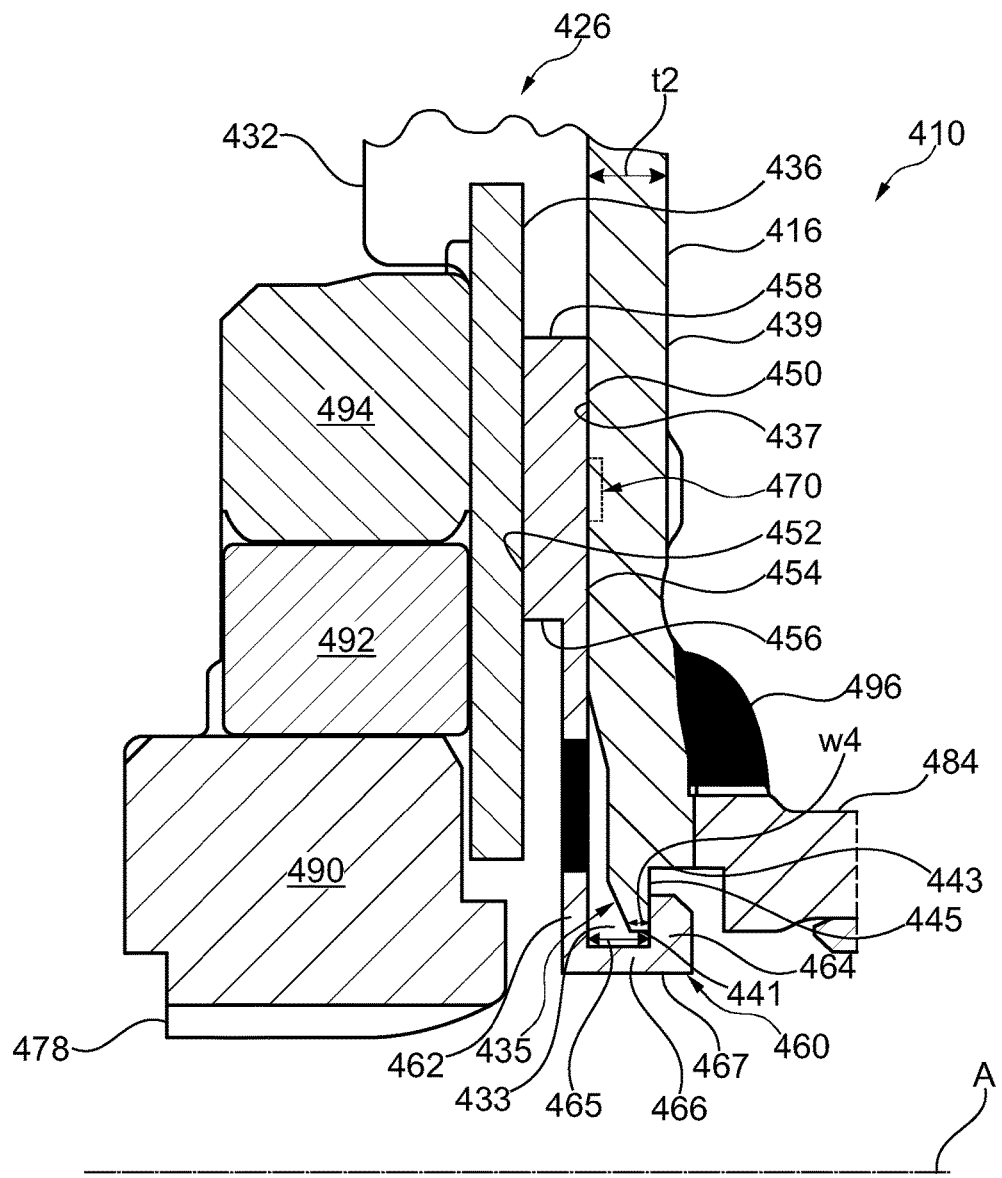

FIG. 10 illustrates a partial cross-sectional side view of stator assembly 426 as in torque converter 410 in accordance with an example aspect. Hydrodynamic thrust bearing 450 includes radial thrust surface 452, opposite radial surface 454, inner circumferential surface 456, outer circumferential surface 458, and axial retention feature 460 attached to or snap fit onto impeller shell 416 including radial neck portion 435. Axial retention feature 460 includes deflectable portion 462, lockable portion 464, and axial portion 466 having width 465 and connecting deflectable portion 462 to lockable portion 464. A fluid pathway is generated between thrust surface 452 and side plate 436.

In an example aspect, torque converter 410 comprises axis of rotation A; turbine 420 having plurality of blades 479; impeller 418 having plurality of blades 481 and impeller shell 416 including inner surface 437, outer surface 439, and a thickness t2 therebetween. Impeller shell 416 further includes impeller neck 435 forming opening 433 concentric with axis of rotation A, wherein neck 435 includes first circumferential surface 441 having width w4, which is at most equal to thickness t2, second circumferential surface 443 disposed radially and axially outward with respect to first circumferential surface 441 and, first radial surface 445 connecting first and second circumferential surfaces 441 and 443, respectively. Torque converter 410 further comprises stator assembly 426 disposed between turbine 420 and impeller 418 and including hydrodynamic thrust bearing 450, disposed between stator assembly 426 and impeller shell 416. Hydrodynamic thrust bearing 450 comprises thrust surface 452 facing stator assembly 426 with a fluid pathway therebetween, supporting surface 454 opposite thrust surface 452 and facing impeller inner surface 437, and axial retention means 460 for attaching to impeller shell neck 435. Axial retention means 460 includes at least two resilient tabs, each tab comprising deflectable portion 462, lockable portion 464, and axial 466 having width 465 and connecting deflectable portion 462 and lockable portion 464, where width 465 is at least equal to width w4. In other example aspects, width 465 is greater than width w4.

In other example aspects, supporting surface 454 of hydrodynamic thrust bearing 450 of torque converter 410 further comprises at least two axially protruding anti-rotation pins 470 for preventing relative motion with impeller 418 once assembled. In an example aspect, thrust surface 452 of hydrodynamic thrust bearing 450 further includes grooves extending from inner circumferential surface 456 to outer circumferential surface 458. In an example aspect, stator side plate 436 further includes a contoured portion for centering hydrodynamic thrust bearing 450. In an example aspect, impeller shell 416 further includes holes for receiving anti-rotation pins 470. In an example aspect, axial portion width 465 is at least equal to the impeller neck thickness w4.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:

1. A torque converter, comprising:
   a turbine;
   an impeller including an impeller shell;
   a stator assembly disposed between the turbine and the impeller, the stator assembly including a side plate; and
   a hydrodynamic thrust bearing, disposed between the stator side plate and the impeller shell, including an axial retention element configured to attach to the stator side plate, wherein the stator assembly further includes a pocket for receiving the axial retention element.

2. The torque converter of claim 1, wherein the hydrodynamic thrust bearing comprises:
   a thrust surface facing the impeller with a fluid pathway therebetween; and
   a supporting surface, opposite the thrust surface, facing the stator assembly and including at least two axially protruding anti-rotation pins received in holes defined in the stator side plate, wherein the anti-rotation pins are configured to prevent relative motion with the stator assembly.

3. The torque converter of claim 2, wherein the thrust surface further includes grooves extending from an inner circumferential surface to an outer circumferential surface.

4. The torque converter of claim 1, wherein the stator assembly further includes a one-way clutch retained by the side plate, and the pocket is located radially outward of the one-way clutch.

5. The torque converter of claim 1, wherein the axial retention element includes at least two resilient tabs, each tab comprising:
   a deflectable portion;
   a lockable portion configured to directly contact a radial surface of the side plate facing the stator pocket; and
   an axial portion connecting the deflectable portion and the lockable portion, wherein the axial portion is secured on an outer circumferential surface of the side plate.

6. A torque converter, comprising:
   a turbine;
   an impeller including an impeller shell having a radially innermost end;
   a stator assembly disposed axially between the turbine and the impeller; and
   a hydrodynamic thrust bearing, disposed between the stator assembly and the impeller shell, including an axial retention element configured to attach to the impeller shell, wherein the radially innermost end of the impeller shell is received within a portion of the axial retention element.

7. The torque converter of claim 6, wherein the axial retention element includes at least two resilient tabs, each tab comprising:
   a deflectable portion;
   a lockable portion configured to directly contact a radial surface of the impeller shell facing away from the stator assembly; and
   an axial portion connecting the deflectable portion and the lockable portion.

8. The torque converter of claim 6, wherein a thickness of the radially innermost end of the impeller shell is less than a thickness of a portion of the impeller shell radially outward from the radially innermost end.

9. The torque converter of claim 6, wherein the radially innermost end of the impeller shell is tapered.

10. The torque converter of claim 6, wherein the stator assembly further comprises a side plate and the hydrodynamic thrust bearing is disposed between the side plate and the impeller shell.

11. The torque converter of claim 6, wherein the hydrodynamic thrust bearing further comprises at least two anti-rotation pins protruding axially toward the impeller shell and configured to prevent relative motion with the impeller.

12. The torque converter of claim 11, wherein the impeller shell includes holes defined therein for receiving the anti-rotation pins.

13. The torque converter of claim 6, wherein the axial retention element attaches around the radially innermost end of the impeller shell.

* * * * *